(12) United States Patent
Oh

(10) Patent No.: US 10,865,795 B2
(45) Date of Patent: Dec. 15, 2020

(54) OIL SEAL STRUCTURE AND COMPRESSING APPARATUS INCLUDING THE SAME

(71) Applicant: Hanwha Power Systems Co., Ltd., Changwon-si (KR)

(72) Inventor: Young June Oh, Changwon-si (KR)

(73) Assignee: HANWHA POWER SYSTEMS CO., LTD., Changwon-si (KR)

( * ) Notice: Subject to any disclaimer, the term of this patent is extended or adjusted under 35 U.S.C. 154(b) by 403 days.

(21) Appl. No.: 15/876,310

(22) Filed: Jan. 22, 2018

(65) Prior Publication Data

US 2018/0274388 A1    Sep. 27, 2018

(30) Foreign Application Priority Data

Mar. 23, 2017    (KR) .......................... 10-2017-0036917

(51) Int. Cl.
*F04D 17/12*    (2006.01)
*F04D 29/42*    (2006.01)
(Continued)

(52) U.S. Cl.
CPC ......... *F04D 17/125* (2013.01); *F01D 25/162* (2013.01); *F01D 25/183* (2013.01);
(Continued)

(58) Field of Classification Search
CPC .. F04D 17/125; F04D 29/124; F04D 29/4206; F04C 29/02–028; F16J 15/54;
(Continued)

(56) References Cited

U.S. PATENT DOCUMENTS 3,390,830 A  *  7/1968  Kahane ................. F01D 25/243
                                                    415/214.1
4,392,752 A      7/1983  Shimizu et al.
(Continued)

FOREIGN PATENT DOCUMENTS

KR    1998-087486 A    12/1998
KR    10-0987539 B1    10/2010
(Continued)

OTHER PUBLICATIONS

First Search in corresponding Chinese application CN 2018101989512, dated May 23, 2020 (Year: 2020).*

(Continued)

*Primary Examiner* — Michael Lebentritt
*Assistant Examiner* — Topaz L. Elliott
(74) *Attorney, Agent, or Firm* — Sughrue Mion, PLLC

(57)    ABSTRACT

An oil seal structure and a compressing apparatus including the oil seal structure are provided. The oil seal structure includes a rotating shaft, a bearing, a lower housing portion, an upper housing portion, an assembly surface seal member inserted into a first assembly surface seal groove, and an oil seal member provided in a first seal groove and a second seal groove and including a flange portion, wherein a lower oil receiving portion is formed in the lower housing portion, a first passage groove is formed in the first seal groove, and an oil passage is formed between a bottom surface of the first passage groove and the flange portion.

20 Claims, 10 Drawing Sheets

(51) Int. Cl.
*F04D 29/08* (2006.01)
*F04D 29/063* (2006.01)
*F04D 29/12* (2006.01)
*F04D 29/05* (2006.01)
*F04D 29/10* (2006.01)
*F01D 25/18* (2006.01)
*F01D 25/16* (2006.01)

(52) U.S. Cl.
CPC ......... *F01D 25/186* (2013.01); *F04D 29/063* (2013.01); *F04D 29/083* (2013.01); *F04D 29/124* (2013.01); *F04D 29/4206* (2013.01); *F04D 29/05* (2013.01); *F04D 29/102* (2013.01); *F05B 2240/57* (2013.01); *F05B 2260/602* (2013.01); *F05B 2260/98* (2013.01)

(58) Field of Classification Search
CPC ..... F16J 15/182; F01D 25/183; F01D 25/243; F01D 25/265; F15B 20/005
USPC .............. 415/124.1, 66–68, 168.2, 230, 392; 285/14; 92/86
See application file for complete search history.

(56) References Cited

U.S. PATENT DOCUMENTS

| | | | |
|---|---|---|---|
| 6,126,414 A | 10/2000 | Koike | |
| 6,935,838 B1* | 8/2005 | Wang | F04D 17/12 415/199.1 |
| 9,745,986 B2* | 8/2017 | Shin | F04D 19/02 |
| 10,309,416 B2* | 6/2019 | Montemayor | F16J 15/062 |
| 10,570,908 B2* | 2/2020 | Gu | F04D 17/122 |
| 2009/0140495 A1* | 6/2009 | Dreifert | F16J 15/406 277/431 |
| 2012/0321455 A1* | 12/2012 | Boening | F04D 29/584 415/208.1 |
| 2013/0058769 A1* | 3/2013 | Sassanelli | F04D 29/124 415/180 |
| 2014/0219775 A1* | 8/2014 | Shin | F04D 19/02 415/66 |
| 2015/0300365 A1* | 10/2015 | Montemayor | F04D 29/42 415/214.1 |
| 2015/0330407 A1* | 11/2015 | Klett | F04D 29/584 415/48 |
| 2016/0115992 A1* | 4/2016 | Kennedy | F04D 25/024 415/173.1 |

FOREIGN PATENT DOCUMENTS

| | | | |
|---|---|---|---|
| KR | 20130110455 A | * | 10/2013 |
| KR | 2015-069341 | * | 6/2015 |
| KR | 20190056724 A | * | 5/2019 |

OTHER PUBLICATIONS

First Office Action in corresponding Chinese application CN 2018101989512, dated May 28, 2020 (Year: 2020).*

* cited by examiner

OIL SEAL STRUCTURE AND COMPRESSING APPARATUS INCLUDING THE SAME

CROSS-REFERENCE TO THE RELATED APPLICATION

This application claims priority from Korean Patent Application No. 10-2017-0036917, filed on Mar. 23, 2017, in the Korean Intellectual Property Office, the disclosure of which is incorporated herein in its entirety by reference.

BACKGROUND

1. Field

Apparatuses consistent with exemplary embodiments relate to an oil seal structure and a compressing apparatus including the same.

2. Description of the Related Art

In general, a rotating machine includes bearings that support a rotating body and a lubrication system.

Bearings may be broadly classified into rolling bearings and journal bearings. Once lubricating oil is injected into a bearing, the bearing easily operates and a rotating body smoothly rotates. In particular, in a journal bearing, an oil film that supports a rotating body is formed by oil in the journal bearing.

When oil is injected into a bearing, it is necessary to prevent the injected oil from leaking out of a rotating machine. If the injected oil leaks out of the rotating machine, an installation place of the rotating machine may be contaminated and the rotating machine may break down due to lack of lubricating oil.

A centrifugal compressor having a structure for preventing oil leakage is disclosed in Korean Patent No. 10-0987539.

SUMMARY

One or more exemplary embodiments provide an oil seal structure which has a simple structure and a compressing apparatus including the oil seal structure.

Various aspects of the exemplary embodiments will be set forth in part in the description which follows and, in part, will be apparent from the description, or may be learned by practice of the presented embodiments.

According to an aspect of an exemplary embodiment, there is provided an oil seal structure which may include: a rotating shaft; a bearing configured to rotatably support the rotating shaft; a lower housing portion comprising a first bearing accommodating groove in which the bearing is provided; an upper housing portion comprising a second bearing accommodating groove in which the bearing is provided; an assembly surface seal member inserted into a first assembly surface seal groove formed in a surface, from among surfaces of the lower housing portion, facing the upper housing portion; and an oil seal member provided in a first seal groove formed in the lower housing portion and a second seal groove formed in the upper housing portion, and comprising a flange portion, wherein a lower oil receiving portion is formed in the lower housing portion to be located between the first bearing accommodating groove and the first seal groove, and wherein a first passage groove which communicates with the first assembly surface seal groove is formed in the first seal groove and an oil passage is formed between a bottom surface of the first passage groove and the flange portion.

At least one oil inlet hole which passes through an inner surface of the bearing and an outer surface of the bearing may be formed in the bearing.

A bearing groove may be formed in an outer surface of the bearing.

A second assembly surface seal groove may be formed in a surface, from among surfaces of the upper housing portion, facing the lower housing portion, and the assembly surface seal member may be inserted into the first assembly surface seal groove and the second assembly surface seal groove.

A second passage groove that communicates with the second assembly surface seal groove may be formed in the second seal groove.

An upper oil receiving portion may be formed in the upper housing portion.

An end portion of the rotating shaft may be located in the lower oil receiving portion and the upper oil receiving portion.

A connection groove which communicates with the first passage groove and the lower oil receiving portion may be formed in the first seal groove.

A seal hole in which the rotating shaft is located may be formed in the oil seal member.

A plurality of seal protrusions may be formed on an inner circumference of the seal hole.

According to an aspect of another exemplary embodiment, there is provided a compressing apparatus which may include: a rotating shaft; at least one bearing configured to rotatably support the rotating shaft; a lower housing portion comprising a first bearing accommodating groove in which the bearing is provided; an upper housing portion comprising a second bearing accommodating groove in which the bearing is provided; an assembly surface seal member inserted into a first assembly surface seal groove formed in a surface, from among surfaces of the lower housing portion, facing the upper housing portion; at least one oil seal member provided in a first seal groove formed in the lower housing portion and a second seal groove formed in the upper housing portion and comprising a flange portion; and at least one impeller driven by receiving power from the rotating shaft, wherein a lower oil receiving portion is formed in the lower housing portion to be located between the first bearing accommodating groove and the first seal groove, and wherein a first passage groove which communicates with the first assembly surface seal groove is formed in the first seal groove and an oil passage is formed between a bottom surface of the first passage groove and the flange portion.

At least one oil inlet hole which passes through an inner surface of the bearing and an outer surface of the bearing may be formed in the bearing.

A bearing groove may be formed in an outer surface of the bearing.

A second assembly surface seal groove may be formed in a surface, from among surfaces of the upper housing portion, facing the lower housing portion, and the assembly surface seal member may be inserted into the first assembly surface seal groove and the second assembly surface seal groove.

A second passage groove which communicates with the second assembly surface seal groove may be formed in the second seal groove.

An upper oil receiving portion may be formed in the upper housing portion.

An end portion of the rotating shaft may be located in the lower oil receiving portion and the upper oil receiving portion.

A connection groove that communicates with the first passage groove and the lower oil receiving portion may be formed in the first seal groove.

A seal hole in which the rotating shaft is located may be formed in the oil seal member.

A plurality of seal protrusions may be formed on an inner circumference of the seal hole.

BRIEF DESCRIPTION OF THE DRAWINGS

These and/or other aspects will become apparent and more readily appreciated from the following description of the exemplary embodiments taken in conjunction with the accompanying drawings, in which.

DETAILED DESCRIPTION

Figure 1:
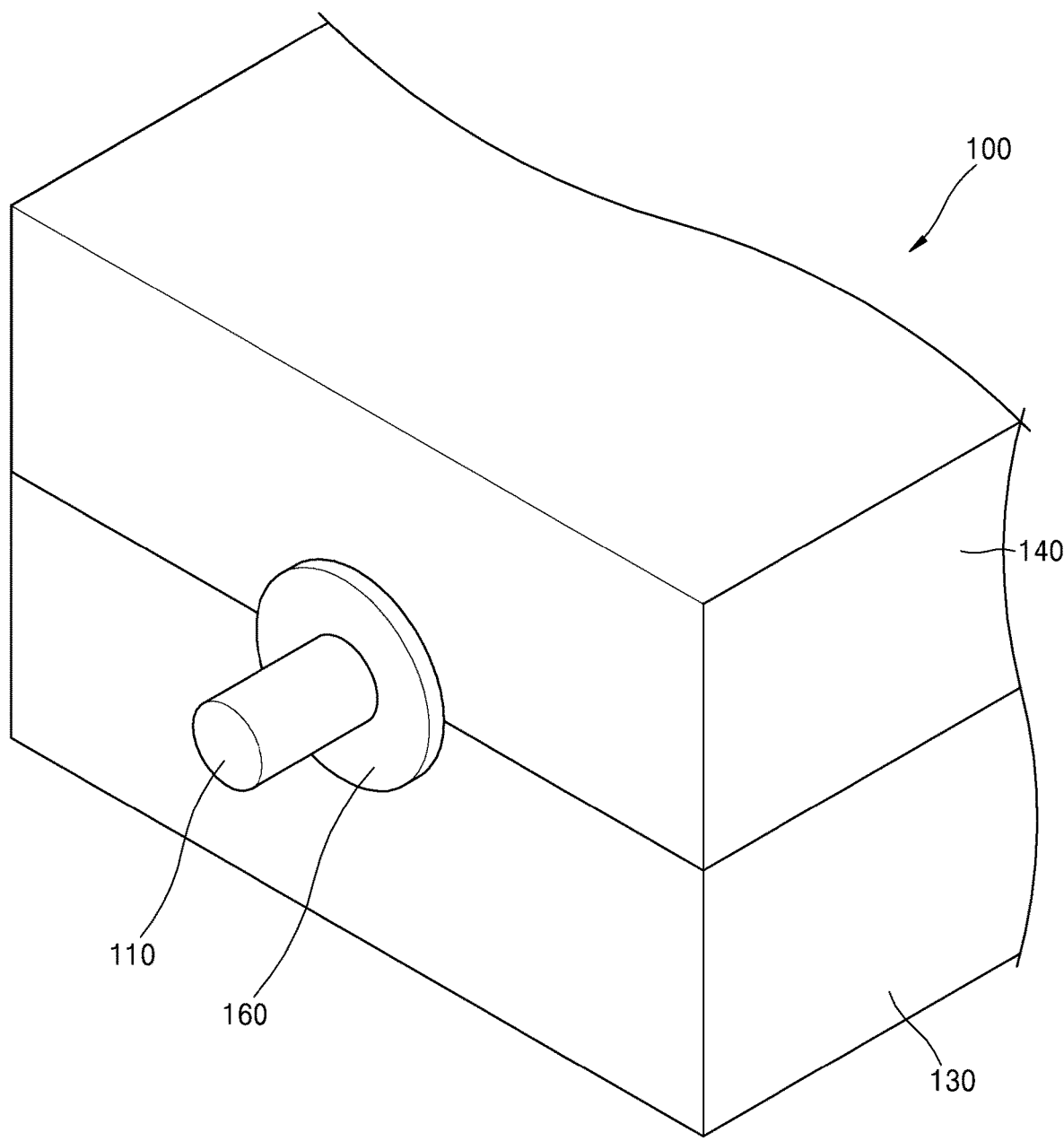
FIG. 1 is a perspective view illustrating an assembled state of an oil seal structure according to an exemplary embodiment.

The inventive concept will now be described more fully with reference to the accompanying drawings, in which exemplary embodiments are shown. Throughout the specification and the drawings, elements having substantially the same configurations are denoted by the same reference numerals, and a repeated explanation thereof will not be given.

Figure 2:
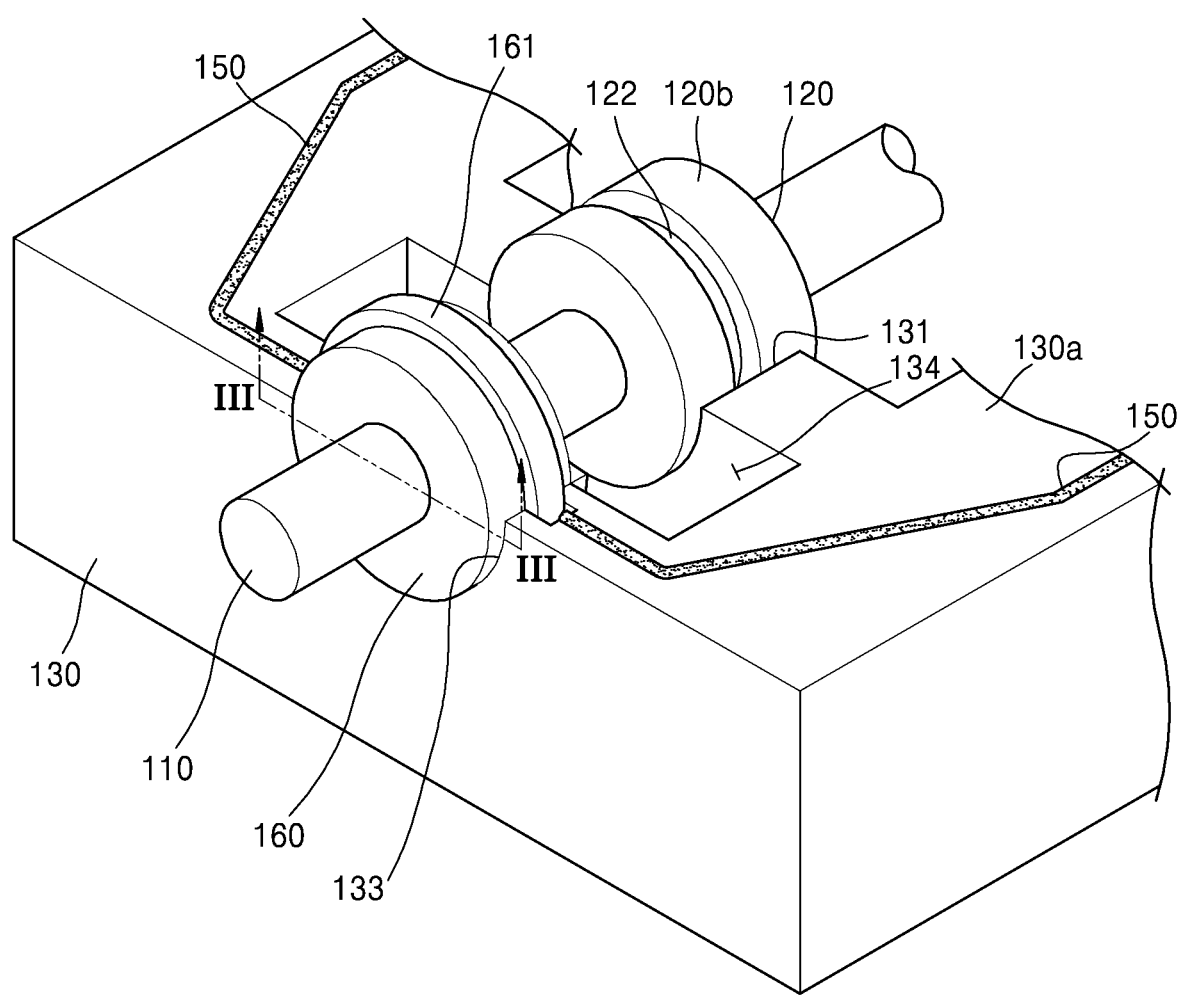
FIG. 2 is a perspective view of the oil seal structure without an upper housing portion according to an exemplary embodiment.
Figure 3:
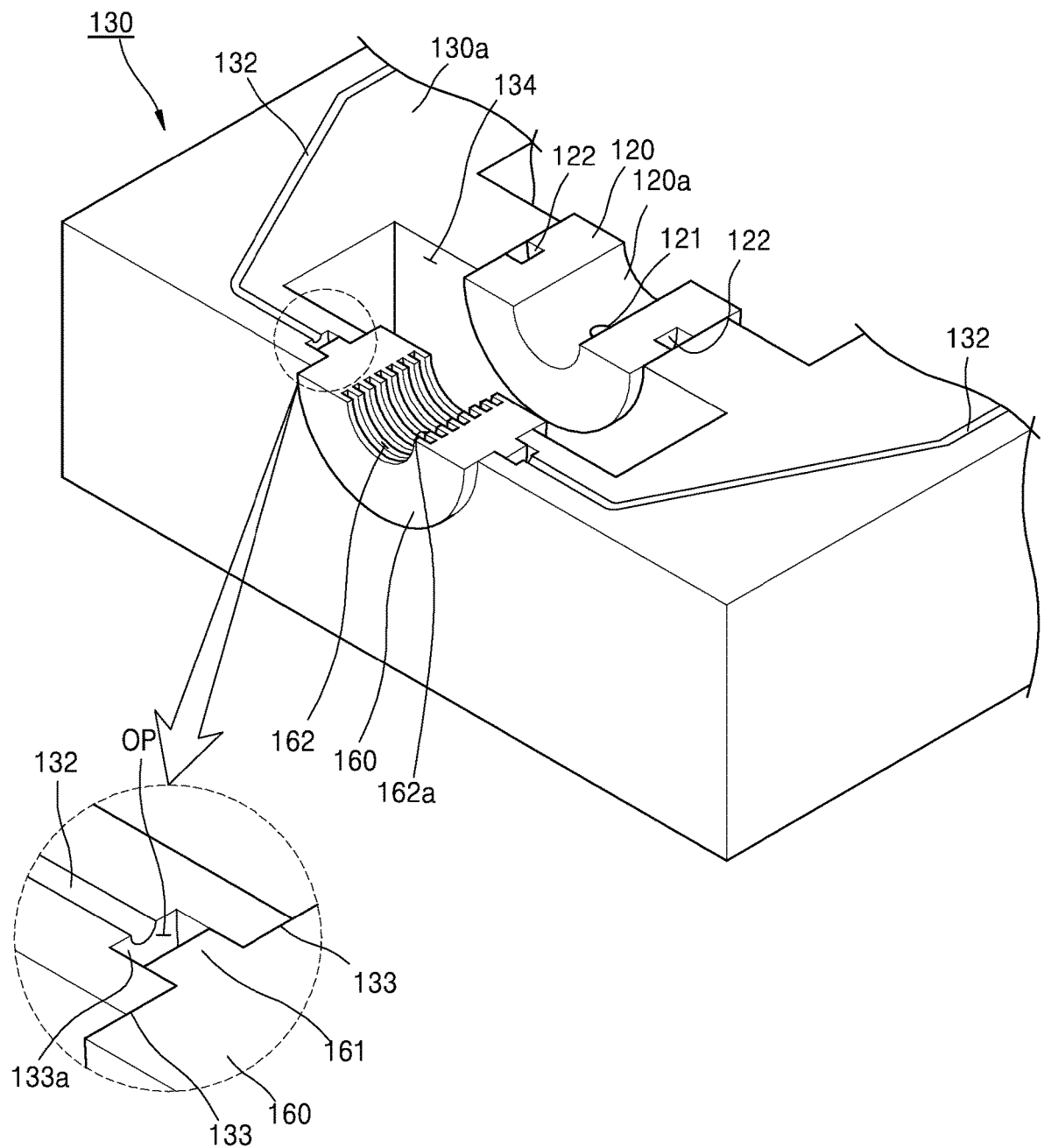
FIG. 3 is a cut-away perspective view of the oil seal structure taken along line III-III of FIG. 2, without a rotating shaft and an assembly surface seal member, for explanation purposes, according to an exemplary embodiment.
Figure 4:
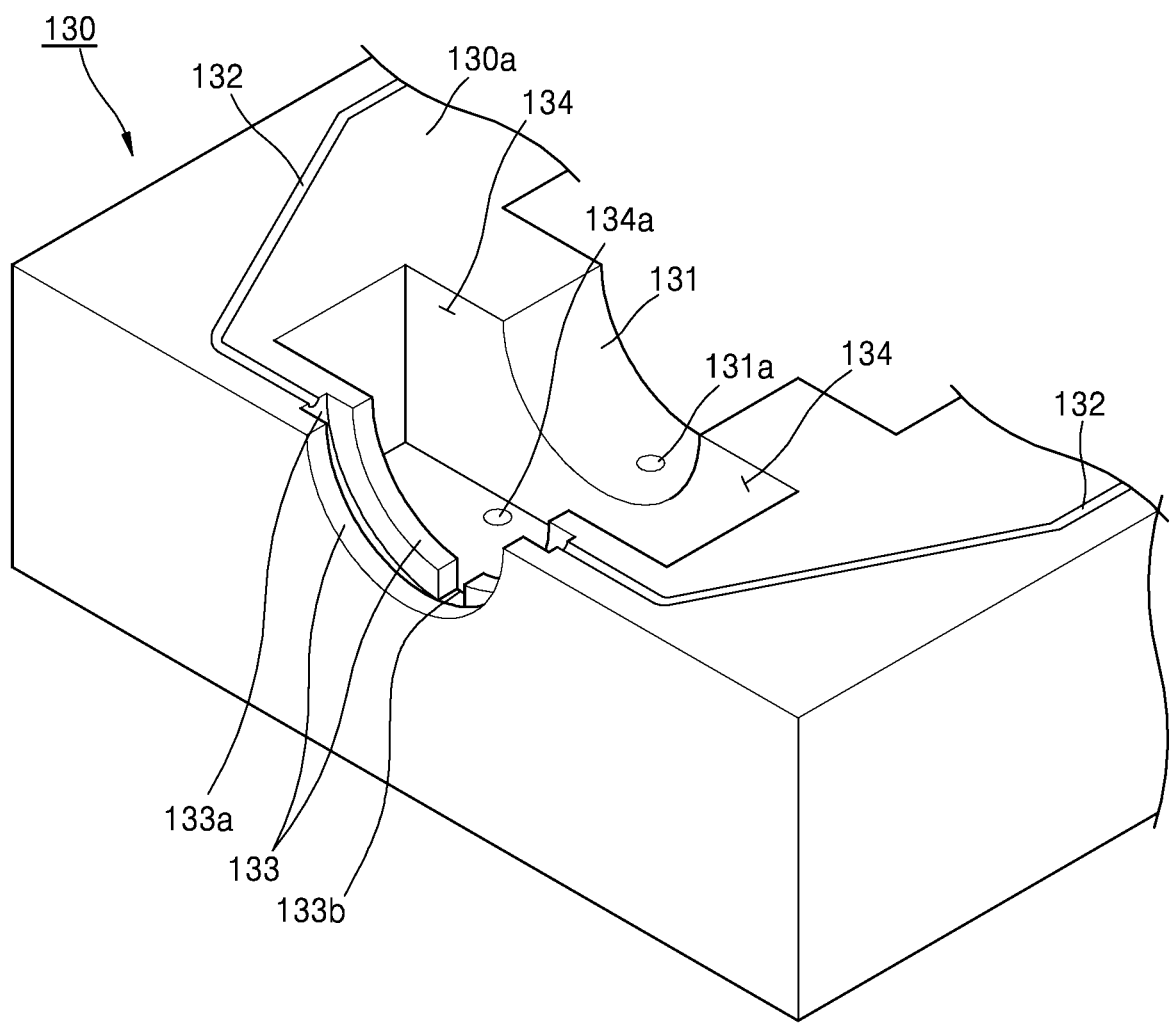
FIG. 4 is a perspective view illustrating a top surface of a lower housing portion according to an exemplary embodiment.
Figure 5:
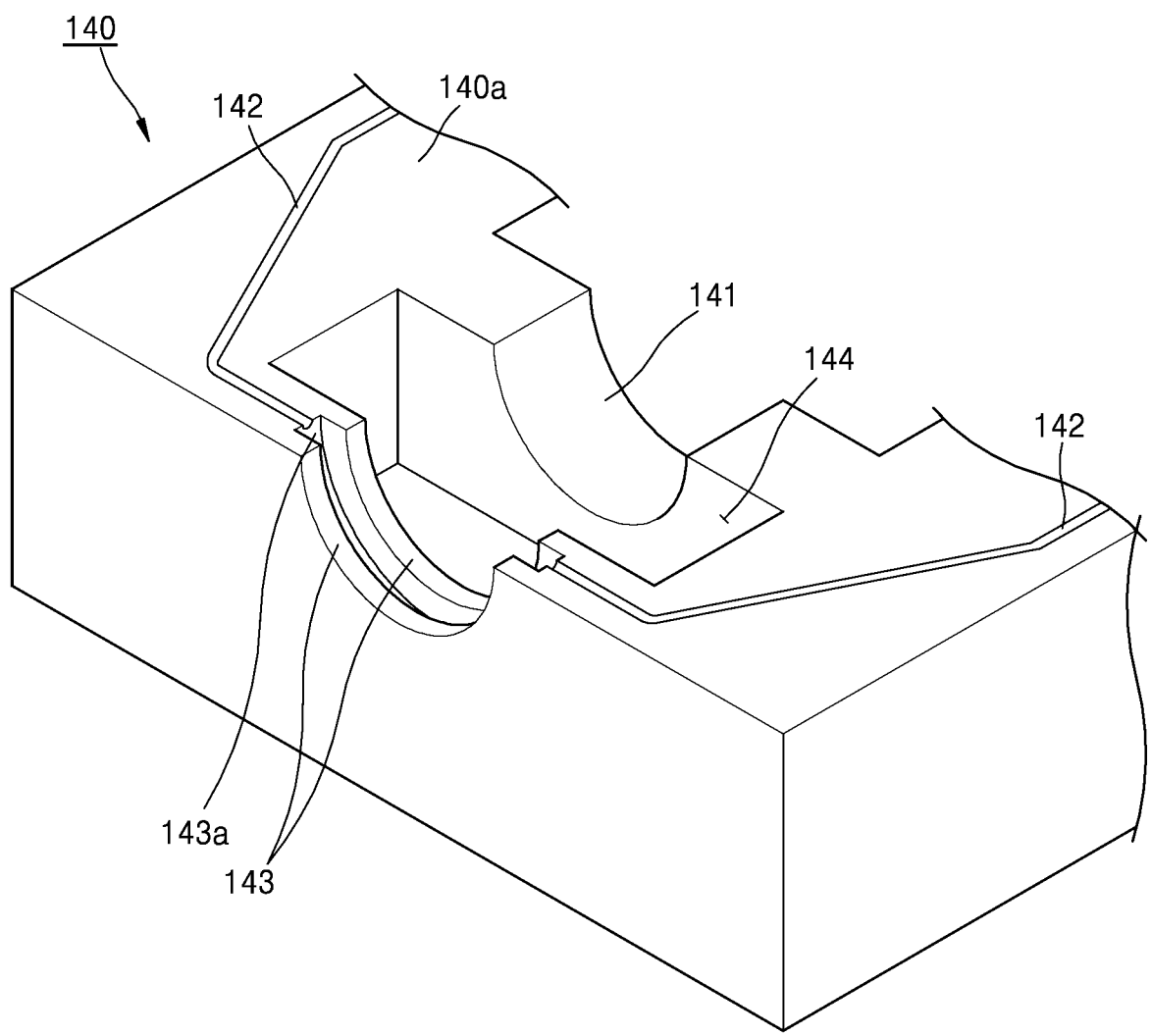
FIG. 5 is a perspective view illustrating a bottom surface of the upper housing portion according to an exemplary embodiment.
Figure 6:
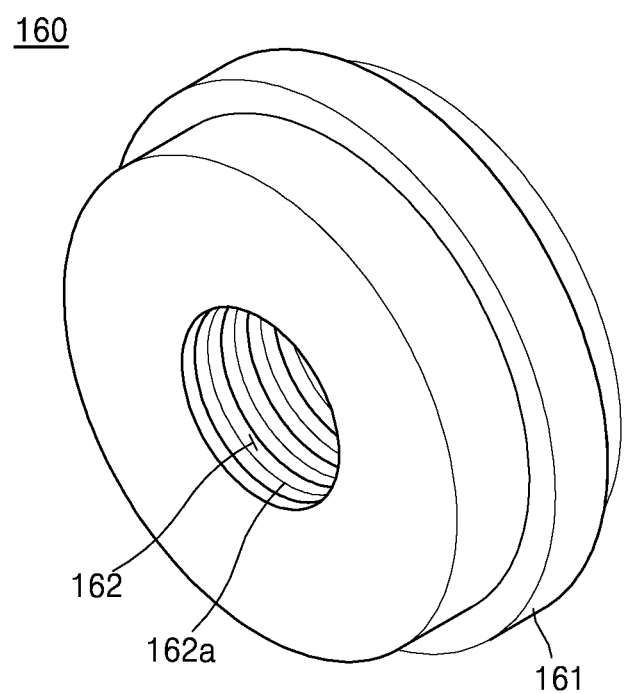
FIG. 6 is a perspective view illustrating an oil seal member according to an exemplary embodiment.

FIG. 1 is a perspective view illustrating an assembled state of an oil seal structure 100 according to an exemplary embodiment. FIG. 2 is a perspective view of the oil seal structure 100 without an upper housing portion 140 according to an exemplary embodiment. FIG. 3 is a cut-away perspective view of the oil seal structure 100 taken along line III-III of FIG. 2, without a rotating shaft 110 and an assembly surface seal member 150, for explanation purposes, according to an exemplary embodiment. FIG. 4 is a perspective view illustrating a top surface of a lower housing portion 130 according to an exemplary embodiment. FIG. 5 is a perspective view illustrating a bottom surface of the upper housing portion 140 according to an exemplary embodiment. FIG. 6 is a perspective view illustrating an oil seal member 160 according to an exemplary embodiment.

The oil seal structure 100 includes the rotating shaft 110, a bearing 120, the lower housing portion 130, the upper housing portion 140, the assembly surface seal member 150, and the oil seal member 160.

The oil seal structure 100 according to the present embodiment is used in a 'rotating machine'. The rotating machine is an apparatus which includes the rotating shaft 110 and the bearing 120 supporting the rotating shaft 110 and into which oil is injected as a lubricating material. The term 'rotating machine' refers to an apparatus including a rotating shaft such as a compressor, a pump, a blower, a turbine, or a supercharger.

The rotating shaft 110 is a member that receives power and rotates, and is rotatably supported by the bearing 120.

The rotating shaft 110 has a length large enough to be exposed outside of an assembly of the lower housing portion 130 and the upper housing portion 140.

Figure 9:
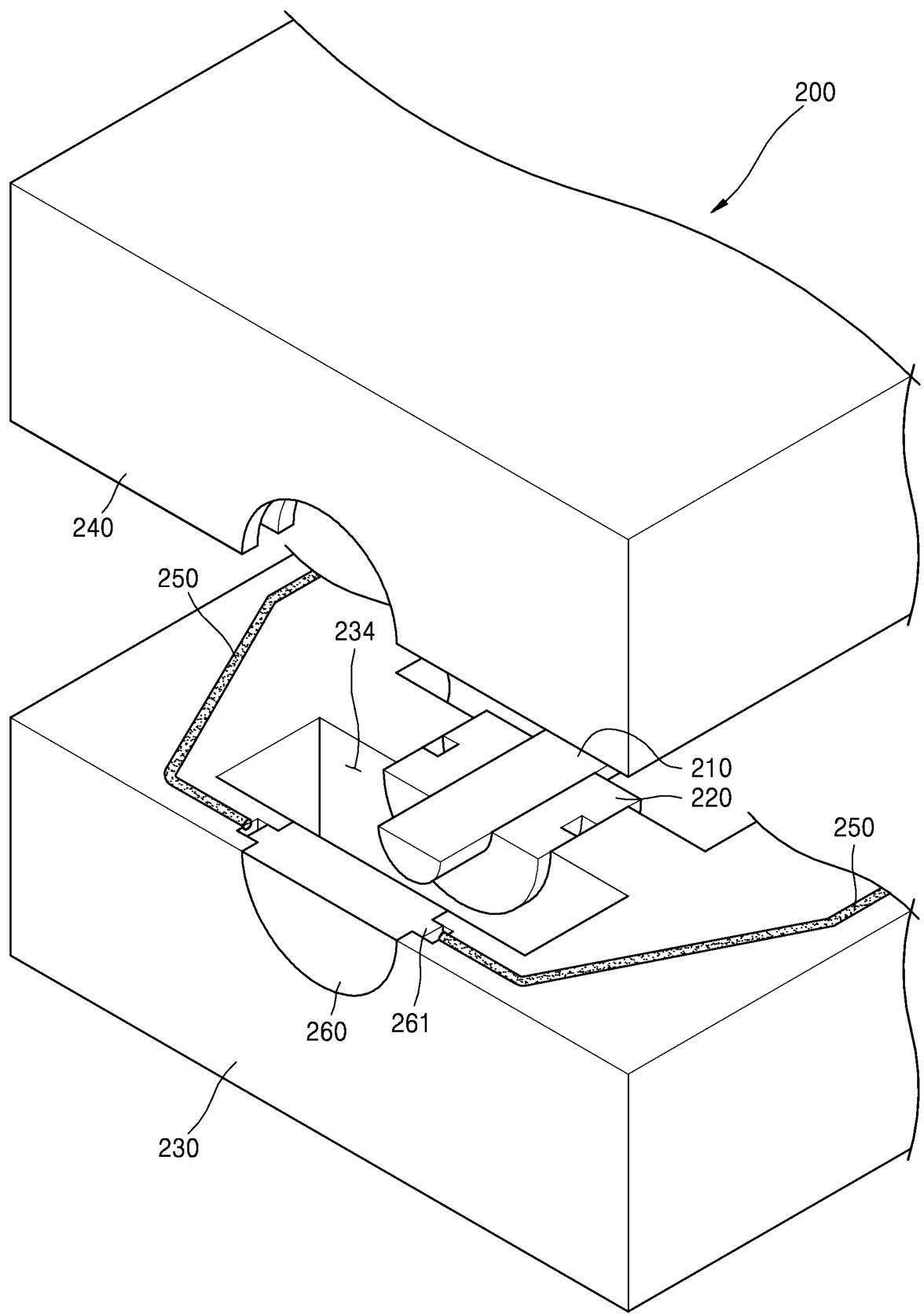
FIG. 9 is a perspective view of an oil seal structure according to another exemplary embodiment, in which an upper housing portion is separated and half parts of a rotating shaft, a bearing, and the oil seal member are shown for explanation purposes.

Although the rotating shaft 110 according to the present embodiment has a length large enough to be exposed outside of the assembly of the lower housing portion 130 and the upper housing portion 140, the inventive concept is not limited thereto. That is, the rotating shaft 110 may be sufficiently short. For example, as shown in FIG. 9, a rotating shaft 210 according to another exemplary embodiment may be formed to be received in the assembly of the lower housing portion 130 and the upper housing portion 140.

The bearing 120 rotatably supports the rotating shaft 110. The bearing 120 is a journal bearing and is a static pressure bearing that supports the rotating shaft 110 when static pressure oil is supplied from an external oil pump (not shown).

The bearing 120 has a cylindrical shape, and includes an inner surface 120a at the center thereof. The rotating shaft 110 is received in the inner surface 120a. At least one oil inlet hole 121 that passes through the inner surface 120a and an outer surface 120b is formed in the bearing 120. Oil output from an oil hole 131a of a first bearing accommodating groove 131 is introduced into the oil inlet hole 121.

A bearing groove 122 is formed in the outer surface 120b of the bearing 120 to facilitate the oil flow when the bearing 120 operates.

Although the bearing 120 according to the present embodiment is a journal bearing, that is, a static pressure bearing in which the oil inlet hole 121 is formed, the inventive concept is not limited thereto. That is, a type and a shape of the bearing 120 according to the inventive concept are not limited as long as the bearing 120 uses oil as a lubricating material. For example, the bearing according to the inventive concept may be a dynamic pressure journal bearing in which the oil inlet hole 121 is not formed or may be a rolling bearing.

Also, although the bearing 120 according to the present embodiment is a journal bearing having one-piece shape, the inventive concept is not limited thereto. That is, the bearing 120 according to the inventive concept may be a journal bearing having a split ring shape including a plurality of pieces.

The lower housing portion 130 is coupled to and forms an assembly with the upper housing 140.

As shown in FIG. 4, the first bearing accommodating groove 131 is formed in the lower housing portion 130. The bearing 120 is provided in the first bearing accommodating groove 131, and the oil hole 131a is formed in the first bearing accommodating groove 131. The oil hole 131a is connected to an oil pump (not shown). When oil discharged at a predetermined pressure from the oil pump is output through the oil hole 131a, and then, is introduced into the oil inlet hole 121, an oil film is formed between the inner surface 120a of the bearing 120 and the rotating shaft 110.

Also, a first assembly surface seal groove 132 is formed in a surface 130a, from among surfaces of the lower housing portion 130, facing the upper housing portion 140. The assembly surface seal member 150 is inserted into the first assembly surface seal groove 132. When oil leaks, the first assembly surface seal groove 132 moves the leaking oil to the first seal groove 133 along with the assembly surface seal member 150.

Also, the first seal groove 133 is formed in the lower housing portion 130, and the oil seal member 160 is provided in the first seal groove 133. The first seal groove 133 is located farther than the first bearing accommodating groove 131 in an axial outer direction of the rotating shaft 110.

A first passage groove 133a is formed in the first seal groove 133. As shown in FIG. 3, a flange portion 161 of the oil seal member 160 is inserted into the first passage groove 133a, and a gap is formed between a bottom surface of the first passage groove 133a and the flange portion 161 to form an oil passage OP. Also, since the first passage groove 133a communicates with the first assembly surface seal groove 132, oil moving through the first assembly surface seal groove 132 and the assembly surface seal member 150 moves to the oil passage OP, and then, moves to a lower oil receiving portion 134.

As shown in FIG. 4, a connection groove 133b that communicates with the first passage groove 133a and the lower oil receiving portion 134 is formed in the first seal groove 133. Oil moving through the oil passage OP moves through the connection groove 133b to the lower oil receiving portion 134.

Also, the lower oil receiving portion 134 is formed in the lower housing portion 130. The lower oil receiving portion 134 is located between the first bearing accommodating groove 131 and the first seal groove 133. The lower oil receiving portion 134 is a space in which oil output from or leaking out of the bearing 120 is received. The oil received in the lower oil receiving portion 134 moves through a bottom hole 134a to the oil pump or to another oil discharge pipe.

As shown in FIG. 5, a second bearing accommodating groove 141 is formed in the upper housing portion 140. The bearing 120 is provided in the second bearing accommodating groove 141.

Also, a second assembly surface seal groove 142 is formed in a surface, from among surfaces of the upper housing portion 140, facing the lower housing portion 130. The assembly surface seal member 150 is inserted into the second assembly surface seal groove 142. When oil leaks, the second assembly surface seal groove 142 moves the leaking oil to a second seal groove 143 and the first seal groove 133 along with the assembly surface seal member 150.

Although the second assembly surface seal groove 142 is formed in the upper housing portion 140 in the present embodiment, the inventive concept is not limited thereto. That is, according to an exemplary embodiment, the second assembly surface seal groove 142 may not be formed in the upper housing portion 140. In this case, a part of the assembly surface seal member 150 is inserted into the first assembly surface seal groove 132 and another part of the assembly surface seal member 150 contacts one surface 140a of the upper housing portion 140 to perform sealing.

Also, the second seal groove 143 is formed in the upper housing portion 140, and the oil seal member 160 is provided in the second seal groove 143. The second seal groove 143 is located outer than the second bearing accommodating groove 141 in the axial direction of the rotating shaft 110.

A second passage groove 143a is formed in the second seal groove 143. The flange portion 161 of the oil seal member 160 is inserted into the second passage groove 143a, and a gap is formed between a bottom surface of the second passage groove 143a and the flange portion 161. Also, the second passage groove 143a communicates with the second assembly surface seal groove 142.

Although the second passage groove 143a is formed to form a gap between the bottom surface of the second passage groove 143a and the flange portion 161 in the present embodiment, the inventive concept is not limited thereto. That is, according to an exemplary embodiment, the second passage groove 143a may be formed not to form a gap between the bottom surface of the second passage groove 143a and the flange portion 161.

Also, an upper oil receiving portion 144 is formed in the upper housing portion 140. The upper oil receiving portion 144 is located between the second bearing accommodating groove 141 and the second seal groove 143. When oil output from or leaking out of the bearing 120 temporarily moves to the upper oil receiving portion 144, the oil moves to the lower oil receiving portion 134 due to gravity.

The assembly surface seal member 150 is inserted between the first assembly surface seal groove 132 and the second assembly surface seal groove 142.

The assembly surface seal member 150 may be formed of an elastic material capable of performing sealing and having a circular cross-sectional shape.

Examples of a material of the assembly surface seal member 150 may include, but are not limited to, silicon, nitrile, fluorinated carbon, chloroprene, fluorinated silicon, and various other materials.

The oil seal member 160 is provided in the first seal groove 133 and the second seal groove 143.

In the present embodiment, the upper housing portion 140 and the lower housing portion 130 are described as separate components of the oil seal structure 100. However, these two housing portions may form one single piece housing of the oil seal structure 100 according to another exemplary embodiment.

As shown in FIG. 6, the flange portion 161 is formed on an outer circumferential surface of the oil seal member 160, and the oil seal member 160 has a cylindrical shape. The flange portion 161 of the oil seal member 160 is located such that a predetermined gap is formed between the flange portion 161 and the bottom surfaces of the first passage groove 133a and the second passage groove 143a to form the oil passage OP.

A seal hole 162 in which the rotating shaft 110 is located is formed at the center of the oil seal member 160. As shown in FIGS. 3 and 6, a plurality of seal protrusions 162a are formed on an inner circumference of the seal hole 162 to perform sealing.

The oil seal member 160 may be formed of any of various materials. For example, the oil seal member 160 may include a synthetic resin, a natural resin, or a metal, or may be formed of a composite material. The oil seal member 160 may be formed of an elastic material. In this case, the oil seal member 160 may be formed of silicon, nitrile, fluorinated carbon, chloroprene, or fluorinated silicon.

Figure 8:
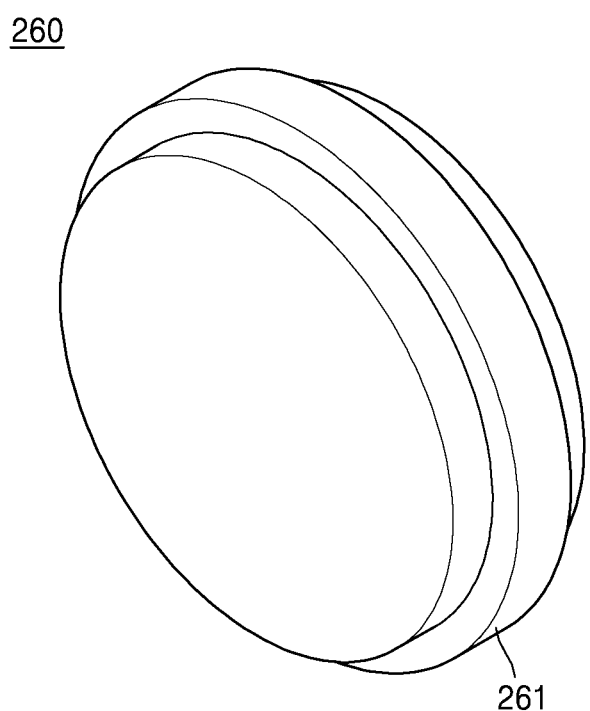
FIG. 8 is a perspective view of an oil seal member according to another exemplary embodiment.

Although the seal hole 162 into which the rotating shaft 110 is inserted is formed at the center of the oil seal member 160 in the present embodiment, the inventive concept is not limited thereto. That is, as shown in FIGS. 8 and 9, a seal hole into which the rotating shaft 210 is inserted may not be formed in an oil seal member 260 according to another exemplary embodiment. In this case, a length of the rotating shaft 210 is sufficiently short, and thus, end portions of the rotating shaft 210 are located in a lower oil receiving portion 234 and an upper oil receiving portion (not shown).

In more detail, although a flange portion 261 is formed on an outer circumferential surface of the oil seal member 260 of FIGS. 8 and 9, a seal hole is not formed at the center of the oil seal member 260, and a length of the rotating shaft 210 of an oil seal structure 200 of FIG. 9 is sufficiently short, and thus, end portions of the rotating shaft 210 are located in the lower oil receiving portion 234 and the upper oil receiving portion. Accordingly, the rotating shaft 210 is completely received in the oil seal structure 200. Configurations and operations of a bearing 220, a lower housing portion 230, an upper housing portion 240, and an assembly surface seal member 250 of the oil seal structure 200 according to these exemplary embodiments are the same as those of the bearing 120, the lower housing portion 130, the upper housing portion 140, and the assembly surface seal member 150, and thus a detailed explanation thereof will not be given.

Figure 7:
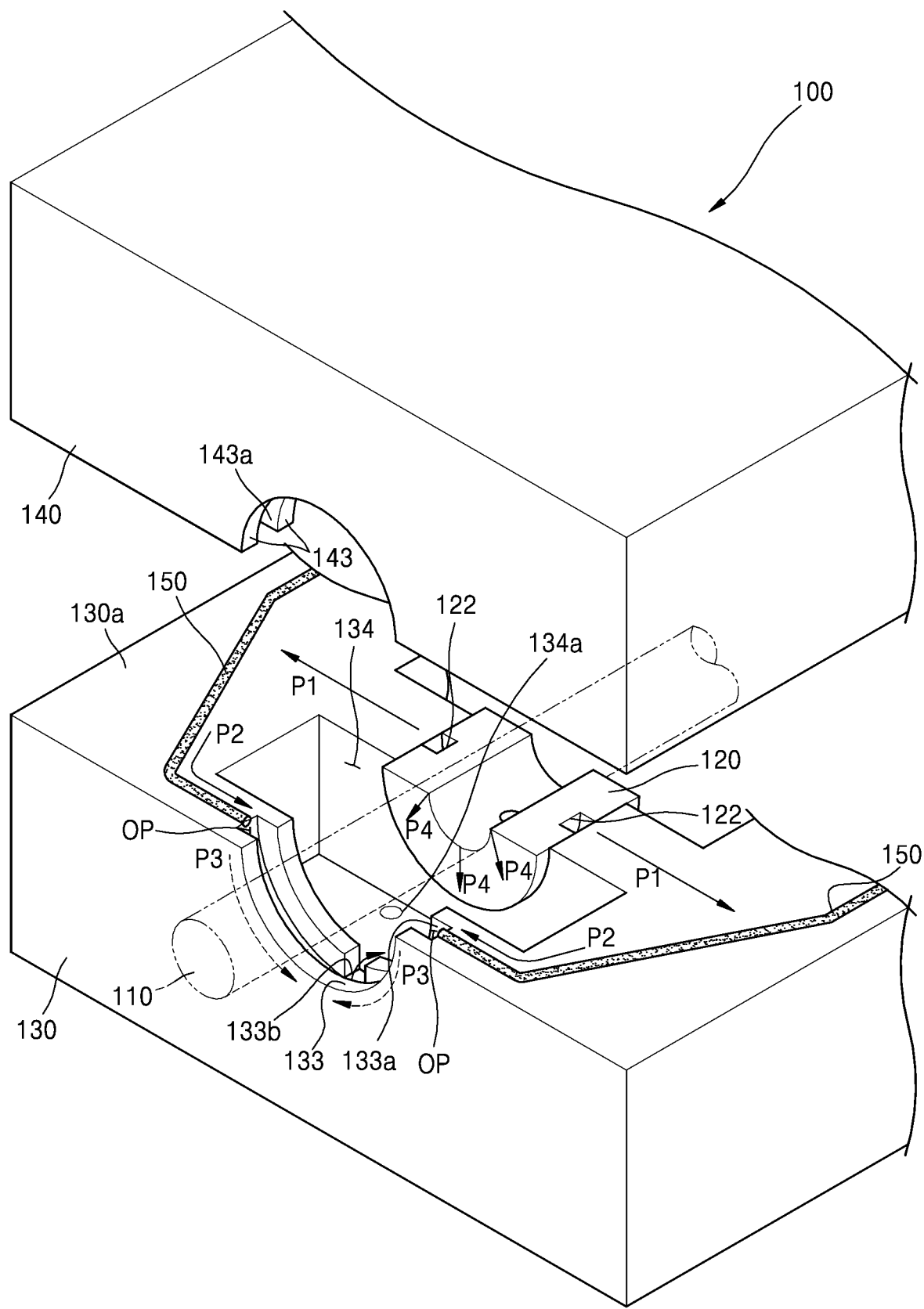
FIG. 7 is a partially exploded perspective view for explaining the flow of oil leaking out of a bearing of the oil seal structure according to an exemplary embodiment.

With reference to FIG. 7, a description will be given of how oil leaking out of the bearing 120 moves when the rotating shaft 110 of the oil seal structure 100 according to the present embodiment rotates with reference to FIG. 7.

FIG. 7 is a partially exploded perspective view for explaining the flow of oil leaking out of the bearing 120 of the oil seal structure 100 according to the present embodiment. In FIG. 7, a half of the bearing 120 is shown and the oil seal member 160 is not shown for an explanation.

When a rotating machine including the oil seal structure 100 starts operating, oil of a predetermined pressure is introduced from the oil hole 131a of the first bearing accommodating groove 131 and moves through the oil inlet hole 121 to the rotating shaft 110 to form an oil film. Next, power is transmitted to the rotating shaft 110 and the rotating shaft 110 begins to rotate.

In this case, part of the oil introduced into the oil hole 131a of the first bearing accommodating groove 131 flows through the bearing groove 122 and leaks along an assembly surface of the lower housing portion 130 and the upper housing portion 140 to a passage P1. The oil leaking to the passage P1 flows through the first assembly surface seal groove 132, the second assembly surface seal groove 142, and the assembly surface seal member 150 to a passage P2. The oil flowing to the passage P2 reaches the first passage groove 133a, flows through the oil passage OP, e.g., a path P3, and moves through the connection groove 133b to the lower oil receiving portion 134.

Another part of the oil introduced into the oil hole 131a of the first bearing accommodating groove 131 reaches the rotating shaft 110 through the oil inlet hole 121 to form an oil film that supports the rotating shaft 110, and moves in the axial direction of the rotating shaft 110 to leak out to a passage P4. The oil leaking out to the passage P4 moves to the lower oil receiving portion 134.

As such, according to the oil seal structure 100 of the present embodiment, since the first seal groove 133 in which the oil seal member 160 is provided communicates with the first assembly surface seal groove 132, a simple structure is realized. Accordingly, manufacturing costs and installation costs of the oil seal structure 100 may be reduced, and maintenance and repair may be facilitated. Compared to the prior art, since a thickness of the oil seal structure 100 in the axial direction of the rotating shaft 110 is reduced and an overall volume of the oil seal structure 100 is less than that in the prior technology, a space may be efficiently used as much as the reduced volume.

Also, in the oil seal structure 100 according to the present embodiment, the first passage groove 133a is formed in the first seal groove 133 in which the oil seal member 160 is provided, the first passage groove 133a forms the oil passage OP along with the flange portion 161, and the oil passage OP communicates with the first assembly surface seal groove 132. Accordingly, since oil leaking out of the bearing 120 moves through the first assembly surface seal groove 132, the second assembly surface seal groove 142 and the assembly surface seal member 150, and then moves through the oil passage OP to the lower oil receiving portion 134, the oil leaking out of the bearing 120 may be effectively collected.

A compressing apparatus 300 to which the above exemplary embodiments are applied will now be explained with reference to FIG. 10.

Figure 10:
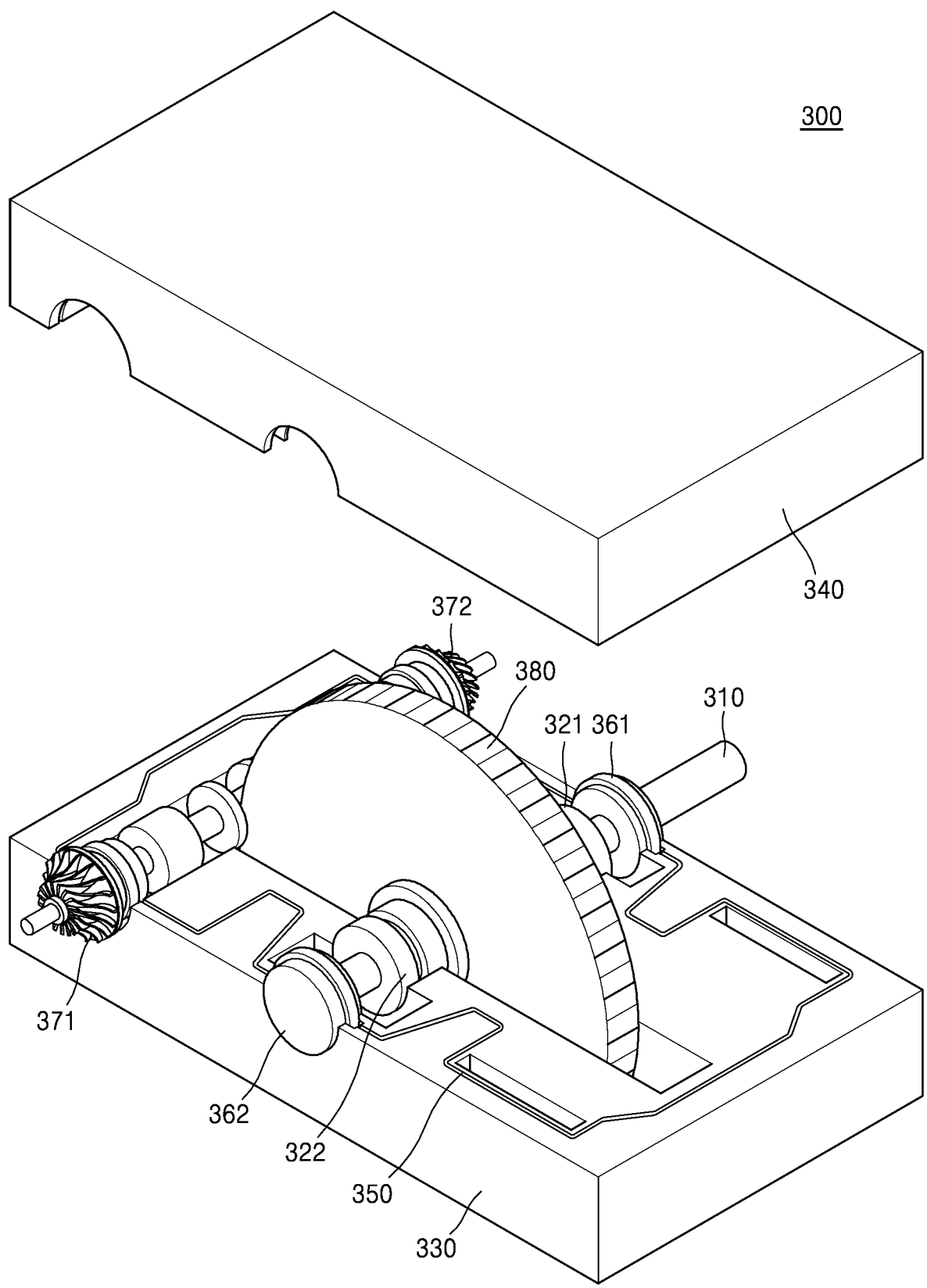
FIG. 10 is a perspective view illustrating a state where an upper housing portion is separated from a compressing apparatus including an oil seal structure according to an exemplary embodiment.

FIG. 10 is a perspective view illustrating a state where an upper housing portion 340 is separated from the compressing apparatus 300 including an oil seal structure is applied according to an exemplary embodiment.

The compressing apparatus 300 of FIG. 10 includes a rotating shaft 310, a first bearing 321, a second bearing 322, a lower housing portion 330, the upper housing portion 340, an assembly surface seal member 350, a first oil seal member 361, a second oil seal member 362, a first impeller 371, a second impeller 372, a bull gear 380, and a scroll casing (not shown). At least one rotating shaft 310 may be provided, and the first impeller 371 and the second impeller 372 are driven by receiving power from the rotating shaft 310 and the bull gear 380. The scroll casing is provided to surround outer surfaces of the first impeller 371 and the second impeller 372. The scroll casing may be a well-known scroll casing, and thus, a detailed explanation thereof will not be given.

In the compressing apparatus 300, elements corresponding to the oil seal structures 100 and 200 are included in the compressing apparatus 300. For example, the first bearing 321 corresponds to the bearing 120, the second bearing 322 corresponds to the bearing 220, the first oil seal member 361 corresponds to the oil seal member 160, and the second oil seal member 362 corresponds to the oil seal member 260.

That is, since elements corresponding to the oil seal structures 100 and 200 are included in the compressing apparatus 300, and thus, the compressing apparatus 300 has a simple structure, manufacturing costs, installation costs, and the number of installation processes may be reduced, and maintenance and repair may be facilitated. Compared to the prior art, since a thickness in an axial direction of the rotating shaft 310 is reduced and an overall volume of the compressing apparatus 300 is reduced, a space may be efficiently used as much as the reduced volume.

Since an oil seal structure and a compressing apparatus according to the above exemplary embodiments have simple structures, manufacturing costs and installation costs thereof may be reduced. Also, compared to the prior art, since an overall volume is reduced, a space may be efficiently used.

While one or more exemplary embodiments have been described with reference to the figures, it will be understood by one of ordinary skill in the art that various changes in form and details may be made therein without departing from the spirit and scope of the inventive concept as defined by the following claims.

What is claimed is:

1. An oil seal structure comprising:
a rotating shaft;
a bearing configured to rotatably support the rotating shaft;
a lower housing portion comprising a first bearing accommodating groove in which the bearing is provided;
an upper housing portion comprising a second bearing accommodating groove in which the bearing is provided;
an assembly surface seal member inserted into a first assembly surface seal groove formed in a surface, from among surfaces of the lower housing portion, facing the upper housing portion; and
an oil seal member provided in a first seal groove formed in the lower housing portion and a second seal groove formed in the upper housing portion, and comprising a flange portion,
wherein a lower oil receiving portion is formed in the lower housing portion to be located between the first bearing accommodating groove and the first seal groove, and
wherein a first passage groove, which is directly connected to the first assembly surface seal groove, is formed in the first seal groove and an oil passage is formed between a bottom surface of the first passage groove and the flange portion.

2. The oil seal structure of claim 1, wherein at least one oil inlet hole which passes through an inner surface of the bearing and an outer surface of the bearing is formed in the bearing.

3. The oil seal structure of claim 1, wherein a bearing groove is formed in an outer surface of the bearing.

4. The oil seal structure of claim 1, wherein a second assembly surface seal groove is formed in a surface, from among surfaces of the upper housing portion, facing the lower housing portion, and
wherein the assembly surface seal member is inserted into the first assembly surface seal groove and the second assembly surface seal groove.

5. The oil seal structure of claim 4, wherein a second passage groove which communicates with the second assembly surface seal groove is formed in the second seal groove.

6. The oil seal structure of claim 1, wherein an upper oil receiving portion is formed in the upper housing portion.

7. The oil seal structure of claim 6, wherein an end portion of the rotating shaft is located in the lower oil receiving portion and the upper oil receiving portion.

8. The oil seal structure of claim 1, wherein a connection groove which communicates with the first passage groove and the lower oil receiving portion is formed in the first seal groove.

9. The oil seal structure of claim 1, wherein a seal hole in which the rotating shaft is located is formed in the oil seal member.

10. The oil seal structure of claim 9, wherein a plurality of seal protrusions are formed on an inner circumference of the seal hole.

11. A compressing apparatus comprising:
a rotating shaft;
at least one bearing configured to rotatably support the rotating shaft;
a lower housing portion comprising a first bearing accommodating groove in which the bearing is provided;
an upper housing portion comprising a second bearing accommodating groove in which the bearing is provided;
an assembly surface seal member inserted into a first assembly surface seal groove formed in a surface, from among surfaces of the lower housing portion, facing the upper housing portion;
at least one oil seal member provided in a first seal groove formed in the lower housing portion and a second seal groove formed in the upper housing portion and comprising a flange portion; and
at least one impeller driven by receiving power from the rotating shaft,
wherein a lower oil receiving portion is formed in the lower housing portion to be located between the first bearing accommodating groove and the first seal groove, and
wherein a first passage groove, which is directly connected to the first assembly surface seal groove, is formed in the first seal groove and an oil passage is formed between a bottom surface of the first passage groove and the flange portion.

12. The compressing apparatus of claim 11, wherein at least one oil inlet hole which passes through an inner surface of the bearing and an outer surface of the bearing is formed in the bearing.

13. The compressing apparatus of claim 11, wherein a bearing groove is formed in an outer surface of the bearing.

14. The compressing apparatus of claim 11, wherein a second assembly surface seal groove is formed in a surface, from among surfaces of the upper housing portion, facing the lower housing portion, and
wherein the assembly surface seal member is inserted into the first assembly surface seal groove and the second assembly surface seal groove.

15. The compressing apparatus of claim 14, wherein a second passage groove which communicates with the second assembly surface seal groove is formed in the second seal groove.

16. The compressing apparatus of claim 11, wherein an upper oil receiving portion is formed in the upper housing portion.

17. The compressing apparatus of claim 16, wherein an end portion of the rotating shaft is located in the lower oil receiving portion and the upper oil receiving portion.

18. The compressing apparatus of claim 11, wherein a connection groove that communicates with the first passage groove and the lower oil receiving portion is formed in the first seal groove.

19. The compressing apparatus of claim 11, wherein a seal hole in which the rotating shaft is located is formed in the oil seal member.

20. The compressing apparatus of claim 19, wherein a plurality of seal protrusions are formed on an inner circumference of the seal hole.

* * * * *